United States Patent
Malikowski et al.

(10) Patent No.: US 10,282,287 B2
(45) Date of Patent: May 7, 2019

(54) INTERLEAVED DIRECT ACCESS MODE IN BYTE ADDRESSIBLE MEMORY AND RELATED DEVICES AND SYSTEMS

(71) Applicant: Intel Corporation, Santa Clara, CA (US)

(72) Inventors: Wojciech Malikowski, Gdansk (PL); Maciej Maciejewski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 14/981,800

(22) Filed: Dec. 28, 2015

(65) Prior Publication Data

US 2017/0185293 A1    Jun. 29, 2017

(51) Int. Cl.
*G06F 3/06* (2006.01)
*G06F 12/02* (2006.01)

(52) U.S. Cl.
CPC ............................... *G06F 12/0246* (2013.01)

(58) Field of Classification Search
None
See application file for complete search history.

(56) References Cited

U.S. PATENT DOCUMENTS

| | | | | |
|---|---|---|---|---|
| 2006/0288187 | A1* | 12/2006 | Burugula | G06F 12/1081 711/171 |
| 2014/0181364 | A1* | 6/2014 | Berke | G06F 13/16 711/103 |
| 2016/0077966 | A1* | 3/2016 | Stabrawa | G06F 3/0604 711/172 |
| 2016/0274792 | A1* | 9/2016 | Ogawa | G06F 3/061 |
| 2016/0321083 | A1* | 11/2016 | Costa | G06F 9/4401 |

* cited by examiner

*Primary Examiner* — Tracy C. Chan
(74) *Attorney, Agent, or Firm* — Thorpe North & Western, LLP (57) ABSTRACT

Memory devices and systems having direct access mode (DAM) space allocation across interleaved non-volatile memory (NVM) modules, as well as methods of allocating direct access mode (DAM) space across interleaved non-volatile memory (NVM) modules are disclosed and described.

21 Claims, 4 Drawing Sheets

INTERLEAVED DIRECT ACCESS MODE IN BYTE ADDRESSIBLE MEMORY AND RELATED DEVICES AND SYSTEMS

BACKGROUND

Computer devices and systems have become integral to the lives of many and include all kinds of uses from social media to intensive computational data analysis. Such devices and systems can include tablets, laptops, desktop computers, network servers, and the like. Memory subsystems play an important role in the implementation of such devices and systems, and are one of the key factors affecting performance.

Memory structures are integrated circuits that provide data storage to a variety of electronics devices. Memory can include volatile memory structures that lose stored information when not powered (e.g., DRAM-Dynamic Random Access Memory), and non-volatile memory structures that retain stored information even when not powered (e.g. NVM). Whether volatile or non-volatile in form, because of the central role of memory in all computing processes, efforts to advance speed and efficiency of memory operation are continuously ongoing.

DESCRIPTION OF EMBODIMENTS

Although the following detailed description contains many specifics for the purpose of illustration, a person of ordinary skill in the art will appreciate that many variations and alterations to the following details can be made and are considered included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of physical connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

Objects or structures described herein as being "adjacent to" each other may be in physical contact with each other, in close proximity to each other, or in the same general region or area as each other, as appropriate for the context in which the phrase is used.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

Figure 1:
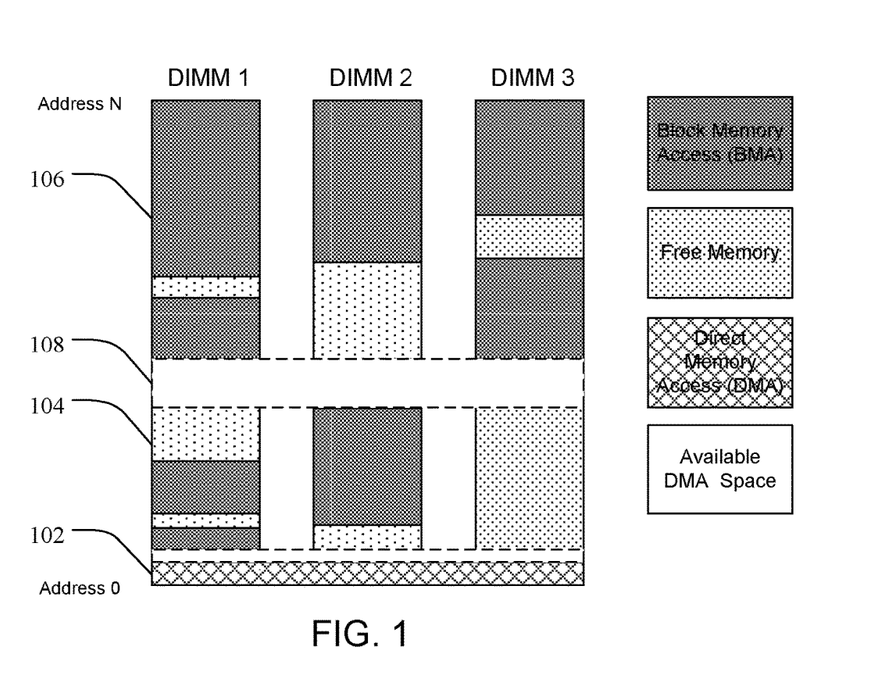
FIG. 1 is a schematic view of exemplary interleaved NVM DIMNIs.

Interleaved memory is a memory architecture whereby physical memory addresses are spread, in some cases evenly, across memory banks or Dual In-Line Memory Modules (DIMMs) in order to improve performance. Such designs can lead to higher memory throughput due to the increased bandwidth for reads and writes across all the interleaved memory banks as compared to one single memory bank with a non-interleaved design. One beneficial use for interleaving, particularly for byte addressable non-volatile memory (NVM) devices, comprises an interleaved direct access memory mode (DAM) set. In one embodiment, for example, mapping of byte-addressable NVM devices (e.g. three dimensional crosspoint memory) can comprise an interleaved DAM set configured to be simultaneously used with block access mode (BAM) addressing. In other words, the DAM space is spread across all of the DIMMs in the interleaved set, and the BAM space is allocated to a single DIMM, although fragmentation can split a block of data across multiple DIMMs. FIG. 1, for example, shows a three DIMM memory scheme having a DAM space 102 spanning across all three DIMMs, regions of free memory 104, and BAM regions 106 filled with data blocks. FIG. 1 additionally shows an available DAM space 108, which comprises a free memory region that spans across all of the DIMMs, and is thus potentially available for DAM allocation.

In such a system, a byte-addressable NVM module can be accessed directly from an operating system (OS) at the DAM address space while the NVM module is simultaneously using BAM regions. Allocation problems can arise, however, with such a mixed environment of an interleaved DAM set and BAM spaces configured as separate instances for each module. For example, over time the memory pool can begin to fragment, thus leading to limited usage of DAM space due to a lack of properly arranged free memory space. In a fragmentation situation, allocation of a new DAM space, or growing an existing DAM space, might be impossible. It can be beneficial, therefore, to maintain the mapping between system physical addresses (SPA) and device physical addresses (DPA). Such mapping can be created and maintained, for example, from the Basic Input/Output System/ Unified Extensible Firmware Interface (BIOS/UEFI) level or from an OS NVM modules driver, however such mapping may negatively affect performance and the available space that can be allocated on the NVM modules.

DAM or "direct access mode," memory for the purposes of the present disclosure, refers to interleaved memory having the same contiguous address space at each NVM DIMM module for efficient use of the memory controller, and that can be accessed directly from the operating system. In the "block access mode" or BAM mechanism, on the other hand, access is restricted to a singular NVM module, where blocks of data can be kept in a contiguous address space, or fragmented in several spaces, as shown in FIG. 1. In a greenfield environment (i.e., completely free memory), BAM allocation will place blocks in a continuous space, which over time will likely become fragmented due to the creation of other blocks, as well as block deletion, resizing, and the like. Thus, DAM and BAM mechanisms, operating at the same time, can lead to situations where NVM capacity is poorly utilized due to inefficient mapping of SPA to DPA.

Furthermore, when allocating a new DAM space of a given size, or increasing the size of an existing DAM space, the memory controller must find a region of the same address space, range, and size on each NVM module, as those regions are interleaved in the system physical memory. The fragmentation of BAM regions, as well as misalignment between NVM modules within the interleave will frequently result in a free memory area not being found for the DAM allocation. The traditional approach to such a situation is to fail the creation request due to the free memory area not being directly available.

The presently disclosed subject matter thus relates to the efficient allocation of space in interleaved NVM devices, including associated systems and methods. With such devices, systems, and methods, enhanced utilization of DAM space can lead to more efficient memory usage, and ultimately enhanced system performance. DAM space creation is optimized to improve space allocation on interleaved NVM modules. In one embodiment, for example, lists of free memory regions for each NVM module can be used to find candidate regions for DAM space creation, followed by fragmentation (in some cases) and relocation of BAM spaces in order to provide address space for the DAM allocation. This allows the allocation of DAM spaces up to the maximum capacity limited by BAM space occupation of NVM module capacity.

Figure 2:
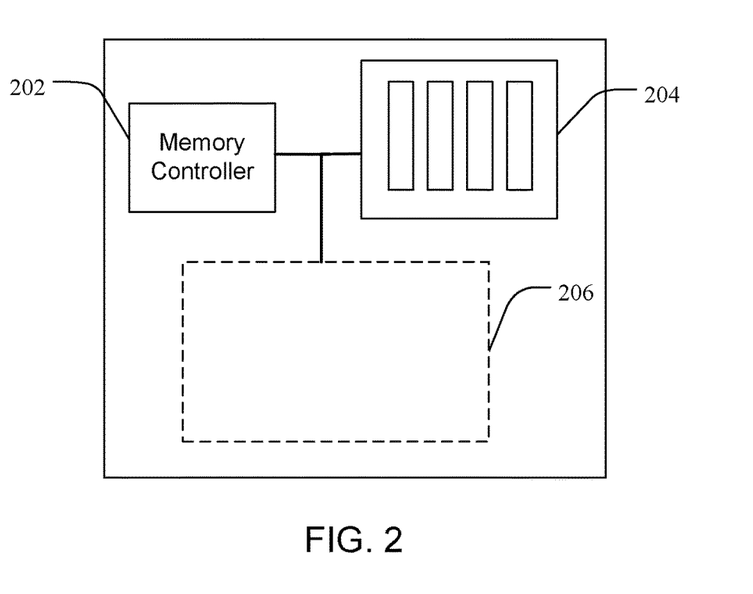
FIG. 2 is a schematic view of an exemplary memory device.
Figure 3:
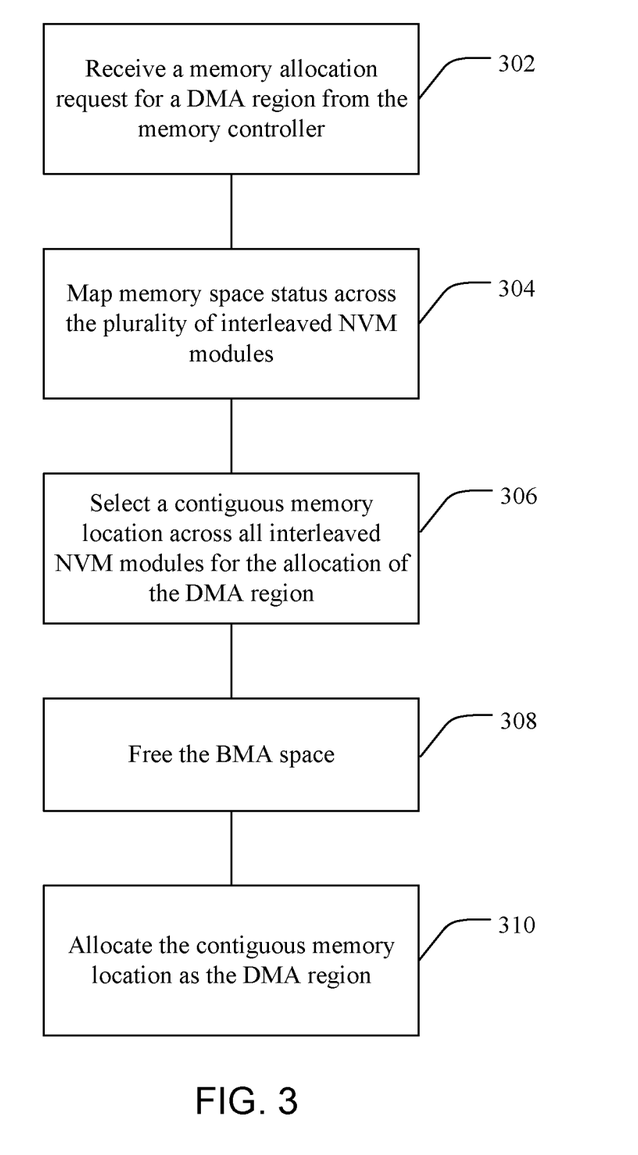
FIG. 3 is representation of steps of an exemplary method of controlling DAM space allocation across interleaved NVM modules in a memory device.

In one embodiment shown in FIG. 2, an example of a memory device having optimized DAM space allocation across interleaved NVM modules is shown. Such a device can comprise a memory controller 202, a plurality of interleaved NVM modules 204, and circuitry 206. The circuitry is configured to, as is shown in FIG. 3, 302 receive a memory allocation request for a DAM region from the memory controller 202, and 304 map memory space status across the plurality of interleaved NVM modules, where the memory space status comprises free memory space and BAM space. The circuitry is further configured to 306 select a contiguous memory region across all interleaved NVM modules from the memory space map for the allocation of the DAM region, where the contiguous memory region has both free memory space and BAM space, 308 free the BAM space, and 310 allocate the contiguous memory region as the DAM region.

Thus, when a DAM space allocation request is received, the circuitry selects an appropriate region of memory across the interleaved set. In one simple embodiment, for example, the circuitry may find a region of memory that is free across the interleaved set, which can be selected for the space allocation. In another embodiment, the circuitry may identify a plurality of potential memory regions from the mapped memory space status, and select the contiguous memory region from the plurality of potential memory regions. In one embodiment, the contiguous memory region selected from the mapped memory space status can be a region that is free across the interleaved set. In another embodiment, the contiguous memory region selected from the mapped memory space status can include free space and BAM space. The mapped memory space status can be generated at the time of receiving the space allocation request, or the circuitry can track the memory space status over time, in some cases maintaining a map of memory space status, from which the contiguous memory region can be selected. It is noted that numerous techniques are contemplated for determining memory status and maintaining such status over time, and any such technique is considered to be within the present scope.

Figure 4A:
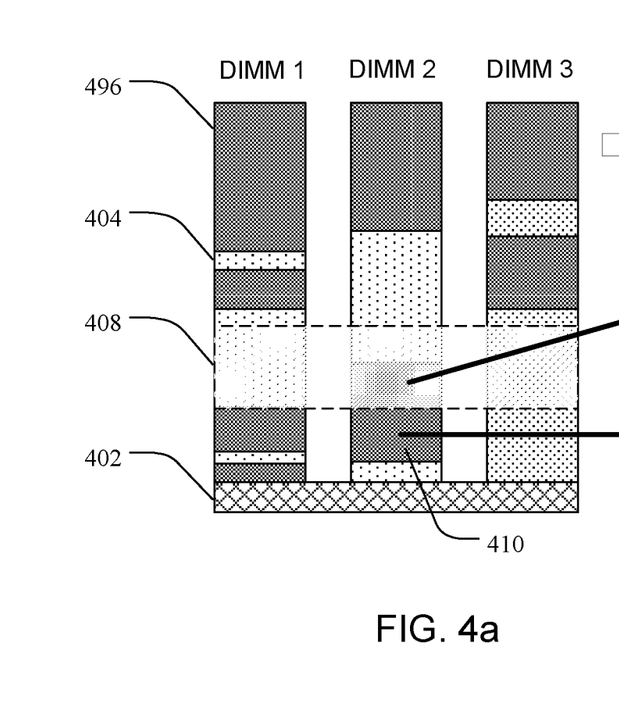
FIG. 4a is a schematic view of exemplary interleaved NVM DIMNIs.
Figure 4B:
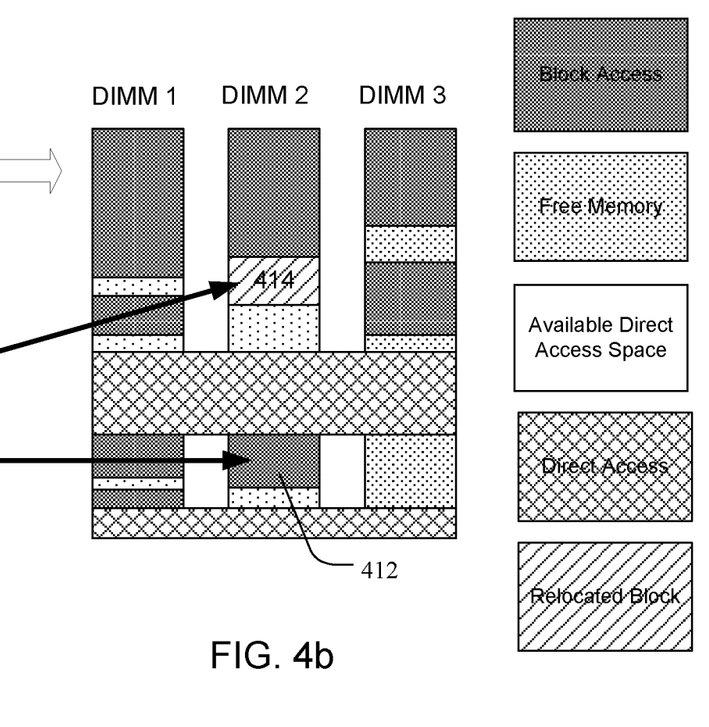
FIG. 4b is a schematic view of exemplary interleaved NVM DIMNIs.

Once the candidate region is selected from the mapped memory space status, the candidate region can be allocated as the DAM region if the candidate region is made up entirely of free memory space. If the candidate region includes BAM space, such BAM space areas can be freed up to make room for the DAM region allocation. Turning to FIGS. 4a-4b, a three DIMM memory structure is shown having a DAM space 402 spanning across all three DIMMs, regions of free memory 404, and BAM regions 406 that store data blocks. Furthermore, FIG. 4a shows a candidate region 408 that comprises both free memory regions 404 and a conflicting BAM region 410. In this case, the conflicting BAM region for 410 is fragmented into a maintained portion 412 and a reallocated portion 414. Thus, in one embodiment, the conflicting BAM region 410 to be reallocated can be identified and passed to an execution module, which can issue a quiescence of Input/Output (I/O) traffic, and can subsequently fragment and/or relocate the conflicting BAM region 412 or a portion thereof. It is noted that the conflicting BAM region 410 can be a single or multiple region(s), on one or more DIMMs. Freeing the conflicting BAM region 410 can be accomplished through a variety of techniques, and any technique for freeing up a memory region is considered to be within the present scope. For example, a conflicting BAM region can be moved or otherwise reallocated to another region, can be fragmented and a portion thereof can be reallocated to another region, or can be fragmented with all portions thereof being reallocated to other regions. Reallocation can thus include one or more portions of the conflicting BAM region, and such portions can be reallocated to the same or a different DIMM, or in some cases to the same and a different DIMM.

Numerous techniques are contemplated for selecting a candidate region for the DAM allocation, and any useful technique is considered to be within the present scope. For example, a candidate region can be selected based on the total amount of free space compared to other regions in the map of memory status, the size of intervening BAM regions, the degree of fragmentation of BAM regions, and the like. In some embodiments, the first potential region located within the memory status map can be selected as the candidate region, or the first potential region matching some cut off criteria can be selected as the candidate region. In other embodiments, the memory status map can be searched to find a candidate region matching a given criteria, such as the maximum free space across all the DIMMs in the interleaved set, the minimum disturbance to the data contained in the memory, effects on circuitry elements including the memory controller, and the like.

It can be beneficial to select a candidate region that can minimize or otherwise reduce the processing load on the memory controller and/or I/O operations performed by the memory. For example, various algorithms can be used to select a candidate region where a minimum number of BAM region manipulations are performed to free up the candidate region, or at least a reduced number of BAM region manipulations compared to other potential regions in the memory status map. Various least changes required algorithms can be used, for example, which are well known to those skilled in the art. The choice of an algorithm should not be seen as a limiting factor, and any beneficial algorithm is considered to be within the present scope. In the case of finding the region where the least data movement would be required to free up the region, it can be helpful to find a set intersection with the least data within the same address range on all sets of DIMMS. Numerous algorithms are capable of accomplishing this result of finding intersections of multiple data sets with varying degrees of accuracy and complexity. There is, however, a trade-off in some cases between the accuracy of finding the "best fit" and the processing required to attain such accuracy. For example, while a "brute force" algorithm searching for the best fit may attain a very accurate result, processing the algorithm may take more time than just moving randomly selected BAM regions to free up candidate region. Such brute force algorithms, as well as the random selection of BAM areas for movement to free up a candidate region, are considered to be within the present scope.

In one specific embodiment, for example, lists of free areas on each DIMM can be subtracted to generate free memory region information. From this a candidate region can be selected, which can include selecting the first region that fits in size, the region with the most free memory area, a region having a higher free memory space compared to a the majority of other potential regions, or any other useful criteria. Additionally, it is noted that multiple algorithms or procedures can be followed to select the candidate region. For example, in the list of free areas example, if the subtraction procedure does not return sufficient free memory region information, additional processing can occur. Such additional processing can include another algorithm, a mere selection of a candidate region such as, for example, picking a free area on the first DIMM and moving all BAM region data from the corresponding addresses of the other DIMMs in the interleaved set.

In one embodiment, a processor module is utilized to perform various processing functions relating to at least the selection of the candidate area, and in some cases to also map the memory status of the DIMMs. Such a processor module can include any hardware, software, or other implementation capable of obtaining the desired functionality. For example, the processor module can be a dedicated processor, an embedded portion of the CPU, memory controller, or the like, including a dedicated region within one or more DIMM.

Furthermore, additional restrictions can be passed to the memory controller or other logic module. For example, in one embodiment fragmentation of particular BAM spaces can be disabled. Such may be useful, for example, to protect system partition regions in the memory from fragmentation movement.

The free space lists and/or memory status maps can be implemented and maintained in a variety of locations and by a variety of processes. Such mapping can be located on one or more of the NVM DIMMs in the interleaved set, on another DIMM, in a lookup table at the memory controller, in system memory, in a dedicated circuit or buffer, and the like. In one embodiment, such mapping can be maintained in the form of Namespace labels on the NVM DIMMs of the interleaved set, on other NVM DIMMs, or any other location where Namespace processes are appropriate.

In another embodiment, a method of optimizing DAM space allocation across interleaved NVM modules is provided. Such a method can comprise receiving a memory allocation request for a DAM region from a memory controller, and mapping memory space status across the plurality of interleaved NVM modules, where the memory space status comprises free memory space and BAM space. The method can further comprise selecting a contiguous memory region across all interleaved NVM modules from the memory space map for the allocation of the DAM region, where the contiguous memory region has both free memory space and BAM space, freeing the BAM space, and allocating the contiguous memory region as the DAM region.

In another embodiment, a non-transitory machine-readable storage medium having instructions embodied thereon for optimizing DAM memory space allocation across interleaved NVM modules is provided. The instructions when executed can perform the following:

receiving, from a memory controller, a memory allocation request for a DAM region;

mapping, using a processor module, memory space status across interleaved NVM modules, the memory space status comprising free memory space and BAM space;

selecting, using the processor module, a contiguous memory region across all interleaved NVM modules for the allocation of the DAM region, the contiguous memory region having both free memory space and BAM space;

freeing, using the memory controller, the BAM space; and allocating, using the memory controller, the contiguous memory region as the DAM region.

Figure 5:
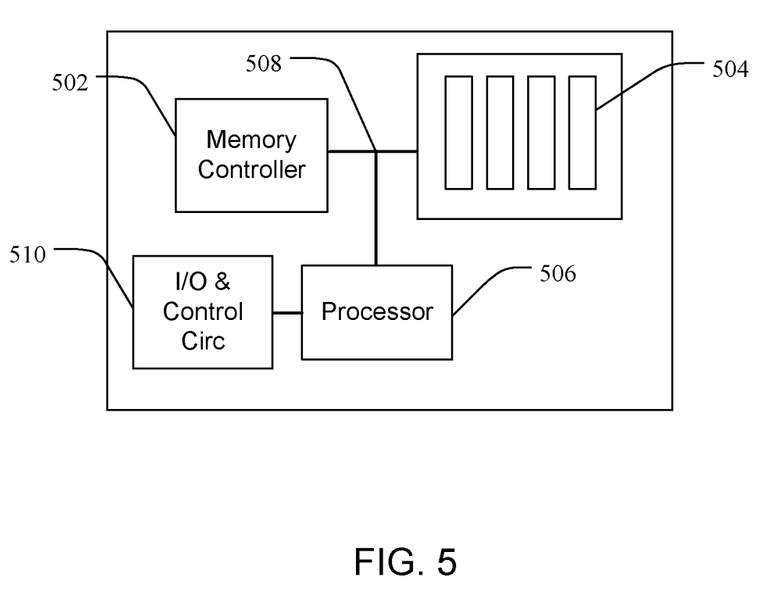
FIG. 5 is a schematic view of an exemplary computing system.

In another embodiment, a computing system having optimized DAM space allocation across interleaved NVM modules is provided, as shown in FIG. 5. The system can include a memory controller 502, a plurality of interleaved NVM modules 504, a processor 506, and circuitry 508. The circuitry can be configured to receive a memory allocation request for a DAM region from the memory controller 502 and map memory space status across the plurality of interleaved NVM modules 504, where the memory space status includes free memory space and BAM space. The circuitry can also be configured to select a contiguous memory region across all interleaved NVM modules 504 from the memory space map for the allocation of the DAM region, where the contiguous memory region has both free memory space and BAM space, free the BAM space, and allocate the contiguous memory region as the DAM region. Various embodiments of such systems can include laptop computers, handheld and tablet devices, CPU systems, SoC systems, server systems, networking systems, storage systems, high capacity memory systems, or any other computational system.

The system can additionally include a local communication interface 508 for connectivity between the various components of the system. For example, the local communication interface can be a local data bus and/or any related address or control busses as may be desired.

The system can also include an I/O (input/output) interface 510 for controlling the I/O functions of the system, as well as for I/O connectivity to devices outside of the system. A network interface can also be included for network connectivity, either as a separate interface or as part of the I/O interface 510. The network interface can control network communications both within the system and outside of the system. The network interface can include a wired interface, a wireless interface, a Bluetooth interface, optical interface, and the like, including appropriate combinations thereof. Furthermore, the system can additionally include various user interfaces, display devices, as well as various other components that would be beneficial for such a system.

The system can also include memory in addition to the interleaved NVM modules 504 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 506 can be a single or multiple processors, and the memory can be a single or multiple memories. The local communication interface can be used as a pathway to facilitate communication between any of a single processor, multiple processors, a single memory, multiple memories, the various interfaces, and the like, in any useful combination.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In one embodiment, reference to memory devices in addition to interleaved NVM modules can refer to other NVM devices whose state is determinate even if power is interrupted to the device. In one embodiment, such an additional NVM device can comprise a block addressable mode memory device, such as NAND or NOR technologies, or more specifically, multi-threshold level NAND flash memory, NOR flash memory, and the like. A memory device can also include a byte-addressable three dimensional crosspoint memory device, or other byte addressable write-in-place nonvolatile memory devices, such as single or multi-level Phase Change Memory (PCM), memory devices that use chalcogenide phase change material (e.g., chalcogenide glass), resistive memory, nanowire memory, ferroelectric transistor random access memory (FeTRAM), magnetoresistive random access memory (MRAM) memory that incorporates memristor technology, or spin transfer torque (STT)-MRAM.

The following examples pertain to specific embodiments and point out specific features, elements, or steps that can be used or otherwise combined in achieving such embodiments.

EXAMPLES

The following examples pertain to specific embodiments and point out specific features, elements, or steps that can be used or otherwise combined in achieving such embodiments.

In one example, there is provided, a memory device having direct access mode (DAM) space allocation across interleaved non-volatile memory (NVM) modules, comprising:
  a memory controller;
  a plurality of interleaved NVM modules; and
  circuitry configured to:
    receive a memory allocation request for a DAM region from the memory controller;
    map memory space status across the plurality of interleaved NVM modules, the memory space status comprising free memory space and block memory access (BAM) space;
    select a contiguous memory region across all interleaved NVM modules from the memory space map for the allocation of the DAM region, the contiguous memory region having both free memory space and BAM space;
    free the BAM space; and
    allocate the contiguous memory region as the DAM region.

In one example of a memory device, in selecting the contiguous memory location, the circuitry is further configured to:
  identify a plurality of potential memory regions from the mapped memory space status; and
  select the contiguous memory region from the plurality of potential memory regions.

In one example of a memory device, in selecting the contiguous memory location, the circuitry is further configured to select a candidate memory region having a higher free memory space than a majority of the plurality of potential memory regions as the contiguous memory location.

In one example of a memory device, the selected candidate memory region has the highest free memory space of the plurality of potential memory regions.

In one example of a memory device, in selecting the contiguous memory location, the circuitry is further configured to process the mapped memory space status with a least changes required algorithm to identify a candidate memory region having a higher free memory space than a majority of the plurality of potential memory regions as the contiguous memory location.

In one example of a memory device, the selected candidate memory region has the highest free memory space of the plurality of potential memory regions.

In one example of a memory device, in freeing the BAM space, the circuitry is further configured to move data from the BAM space to another NVM memory location.

In one example of a memory device, moving data from the BAM space further comprises fragmenting the data and moving at least a portion of the data.

In one example of a memory device, the circuitry further comprises a processor to module configured to select the contiguous memory location.

In one example there is provided, a method of allocating direct access mode (DAM) space across interleaved non-volatile memory (NVM) modules, comprising:
  receiving a memory allocation request for a DAM region;
  mapping memory space status across interleaved NVM modules, the memory space status comprising free memory space and block memory access (BAM) space;
  selecting a contiguous memory region across all interleaved NVM modules for the allocation of the DAM region, the contiguous memory region having both free memory space and BAM space;
  freeing the BAM space; and
  allocating the contiguous memory region as the DAM region.

In one example of a method for allocating DAM space, selecting the contiguous memory region further comprises:
  identifying a plurality of potential memory regions from the mapped memory space status; and
  selecting the contiguous memory region from the plurality of potential memory regions.

In one example of a method for allocating DAM space, selecting the contiguous memory region further comprises selecting a candidate memory region having a higher free memory space than a majority of the plurality of potential memory regions as the contiguous memory location.

In one example of a method for allocating DAM space, the selected candidate memory region has the highest free memory space of the plurality of potential memory regions.

In one example of a method for allocating DAM space, selecting the contiguous memory region further comprises processing the mapped memory space status with a least changes required algorithm to identify a candidate memory region having a higher free memory space than a majority of the plurality of potential memory regions as the contiguous memory location.

In one example of a method for allocating DAM space, the selected candidate memory region has the highest free memory space of the plurality of potential memory regions.

In one example of a method for allocating DAM space, freeing the BAM space further comprises moving data from the BAM space to another NVM memory location.

In one example of a method for allocating DAM space, moving data from the BAM space further comprises fragmenting the data.

In one example there is provided, a non-transitory machine-readable storage medium having instructions embodied thereon for allocating direct access mode (DAM) memory space across interleaved non-volatile memory (NVM) modules, the instructions when executed perform the following:
  receive, from a memory controller, a memory allocation request for a DAM region;
  map, using a processor module, memory space status across interleaved NVM modules, the memory space status comprising free memory space and block memory access (BAM) memory space;
  select, using the processor module, a contiguous memory region across all interleaved NVM modules for the allocation of the DAM region, the contiguous memory region having both free memory space and BAM space;
  free, using the memory controller, the BAM space; and
  allocate, using the memory controller, the contiguous memory region as the DAM region.

In one example of a non-transitory machine-readable storage medium, selecting, using the processor module, a contiguous memory region further comprises:
  identifying a plurality of potential memory regions from the mapped memory space status; and
  selecting the contiguous memory region from the plurality of potential memory regions.

In one example of a non-transitory machine-readable storage medium, selecting the contiguous memory region further comprises selecting a candidate memory region having a higher free memory space than a majority of the plurality of potential memory regions as the contiguous memory location.

In one example of a non-transitory machine-readable storage medium, the selected candidate memory region has the highest free memory space of the plurality of potential memory regions.

In one example of a non-transitory machine-readable storage medium, selecting the contiguous memory region further comprises processing the mapped memory space status with a least changes required algorithm to identify a candidate memory region having a higher free memory space than a majority of the plurality of potential memory regions as the contiguous memory location.

In one example of a non-transitory machine-readable storage medium, the selected candidate memory region has the highest free memory space of the plurality of potential memory regions.

In one example of a non-transitory machine-readable storage medium, freeing the BAM space further comprises moving data from the BAM space to another NVM memory location.

In one example of a non-transitory machine-readable storage medium, moving data from the BAM space further comprises fragmenting the data and moving at least a portion of the data.

In one example there is provided, a computing system having direct access mode (DAM) space allocation across interleaved non-volatile memory (NVM) modules, comprising:
  a memory controller;
  a processor;
  a plurality of interleaved NVM modules; and
  circuitry configured to:
    receive a memory allocation request for a DAM region from the memory controller;
    map memory space status across the plurality of interleaved NVM modules, the memory space status comprising free memory space and block memory access (BAM) space;
    select a contiguous memory region across all interleaved NVM modules from the memory space map for the allocation of the DAM region, the contiguous memory region having both free memory space and BAM space;
    free the BAM space; and
    allocate the contiguous memory region as the DAM region.

In one example of a computing system, in selecting the contiguous memory location, the circuitry is further configured to:
  identify a plurality of potential memory regions from the mapped memory space status; and
  select the contiguous memory region from the plurality of potential memory regions.

In one example of a computing system, in selecting the contiguous memory location, the circuitry is further configured to select a candidate memory region having a higher free memory space than a majority of the plurality of potential memory regions as the contiguous memory location.

In one example of a computing system, the selected candidate memory region has the highest free memory space of the plurality of potential memory regions.

In one example of a computing system, in selecting the contiguous memory location, the circuitry is further configured to process the mapped memory space status with a least changes required algorithm to identify a candidate memory region having a higher free memory space than a majority of the plurality of potential memory regions as the contiguous memory location.

In one example of a computing system, the selected candidate memory region has the highest free memory space of the plurality of potential memory regions.

In one example of a computing system, in freeing the BAM space, the circuitry is further configured to move data from the BAM space to another NVM memory location.

In one example of a computing system, moving data from the BAM space further comprises fragmenting the data and moving at least a portion of the data.

In one example of a computing system, the circuitry further comprises a processor module configured to select the contiguous memory location.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. An apparatus, comprising:
  a memory controller;

a plurality of interleaved byte-addressable non-volatile memory (NVM) modules;
a block memory access (BAM) space allocated to each NVM module;
an interleaved direct access mode (DAM) region having a same contiguous address space at each NVM module; and
circuitry configured to:
receive a memory allocation request to the DAM region from the memory controller;
map memory space status across the plurality of NVM modules, the mapped memory space status comprising free memory space and BAM space;
select a contiguous memory region across the plurality of NVM modules from the mapped memory space status for a memory allocation to the DAM region, the contiguous memory region having both free memory space and BAM space;
free the BAM space in the contiguous memory region; and
allocate the contiguous memory region to the DAM region.

2. The apparatus of claim 1, wherein, in selecting the contiguous memory region, the circuitry is further configured to:
identify a plurality of potential memory regions from the mapped memory space status; and
select the contiguous memory region from the plurality of potential memory regions.

3. The apparatus of claim 2, wherein, in selecting the contiguous memory region, the circuitry is further configured to select a candidate memory region having a higher free memory space than a majority of the plurality of potential memory regions as the contiguous memory region.

4. The apparatus of claim 3, wherein the selected candidate memory region has the highest free memory space of the plurality of potential memory regions.

5. The apparatus of claim 2, wherein, in selecting the contiguous memory region, the circuitry is further configured to process the mapped memory space status with a least changes required algorithm to identify a candidate memory region having a higher free memory space than a majority of the plurality of potential memory regions as the contiguous memory region.

6. The apparatus of claim 5, wherein the identified candidate memory region has the highest free memory space of the plurality of potential memory regions.

7. The apparatus of claim 1, wherein, in freeing the BAM space, the circuitry is further configured to move data from the BAM space to another NVM memory location.

8. The apparatus of claim 7, wherein moving data from the BAM space further comprises fragmenting the data and moving at least a portion of the data.

9. The apparatus of claim 1, wherein the circuitry further comprises a processor module configured to select the contiguous memory region.

10. A method of allocating direct access mode (DAM) space across interleaved byte-addressable non-volatile memory (NVM) modules, comprising:
receiving a memory allocation request for a DAM region;
mapping memory space status across interleaved NVM modules, where each NVM module includes an allocated block memory access (BAM) space and the mapped memory space status comprises free memory space and BAM space;
selecting a contiguous memory region across all interleaved NVM modules for the allocation of the DAM region having a same contiguous address space at each interleaved NVM module, the contiguous memory region having both free memory space and BAM space;
freeing the BAM space in the contiguous memory region; and
allocating the contiguous memory region as the DAM region.

11. The method of claim 10, wherein selecting the contiguous memory region further comprises:
identifying a plurality of potential memory regions from the mapped memory space status; and
selecting the contiguous memory region from the plurality of potential memory regions.

12. The method of claim 11, wherein selecting the contiguous memory region further comprises processing the mapped memory space status with a least changes required algorithm to identify a candidate memory region having a higher free memory space than a majority of the plurality of potential memory regions as the contiguous memory region.

13. The method of claim 10, wherein freeing the BAM space further comprises moving data from the BAM space to another NVM memory location.

14. A non-transitory machine-readable storage medium having instructions embodied thereon for allocating direct access mode (DAM) memory space across interleaved non-volatile memory (NVM) modules, the instructions when executed perform the following:
receive, from a memory controller, a memory allocation request for a DAM region;
map, using a processor module, memory space status across the interleaved NVM modules, the mapped memory space status comprising free memory space and block memory access (BAM) memory space;
select, using the processor module, a contiguous memory region across all interleaved NVM modules for the allocation of the DAM region, the contiguous memory region having both free memory space and BAM space;
free, using the memory controller, the BAM space in the contiguous memory region; and
allocate, using the memory controller, the contiguous memory region as the DAM region.

15. The non-transitory machine-readable storage medium of claim 14, wherein selecting, using the processor module, a contiguous memory region further comprises:
identifying a plurality of potential memory regions from the mapped memory space status; and
selecting the contiguous memory region from the plurality of potential memory regions.

16. The non-transitory machine-readable storage medium of claim 15, wherein selecting the contiguous memory region further comprises processing the mapped memory space status with a least changes required algorithm to identify a candidate memory region having a higher free memory space than a majority of the plurality of potential memory regions as the contiguous memory region.

17. The non-transitory machine-readable storage medium of claim 14, wherein freeing the BAM space further comprises moving data from the BAM space to another NVM memory location.

18. A computing system having direct access mode (DAM) space allocation across interleaved byte-addressable non-volatile memory (NVM) modules, comprising:
a memory controller;
a processor;
a plurality of interleaved NVM modules;
a block memory access (BAM) space allocated to each interleaved NVM module;

an interleaved DAM region having a same contiguous address space at each interleaved NVM module; and circuitry configured to:
- receive a memory allocation request to the interleaved DAM region from the memory controller;
- map memory space status across the plurality of interleaved NVM modules, the mapped memory space status comprising free memory space and BAM space;
- select a contiguous memory region across all interleaved NVM modules from the mapped memory space status for a memory allocation to the interleaved DAM region, the contiguous memory region having both free memory space and BAM space;
- free the BAM space in the contiguous memory region; and
- allocate the contiguous memory region to the interleaved DAM region.

19. The system of claim 18, wherein, in selecting the contiguous memory region, the circuitry is further configured to:
- identify a plurality of potential memory regions from the mapped memory space status; and
- select the contiguous memory region from the plurality of potential memory regions.

20. The system of claim 19, wherein, in selecting the contiguous memory region, the circuitry is further configured to process the mapped memory space status with a least changes required algorithm to identify a candidate memory region having a higher free memory space than a majority of the plurality of potential memory regions as the contiguous memory region.

21. The system of claim 19, wherein the circuitry further comprises a processor module configured to select the contiguous memory region.

* * * * *